United States Patent
Inoue et al.

(10) Patent No.: US 8,539,194 B2
(45) Date of Patent: Sep. 17, 2013

(54) STORAGE SYSTEM AND METHOD FOR STORAGE CAPACITY CHANGE OF HOST-DEVICE-SPECIFIED DEVICE

(75) Inventors: Shintaro Inoue, Odawara (JP); Yutaka Takata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 719 days.

(21) Appl. No.: 12/210,276

(22) Filed: Sep. 15, 2008

(65) Prior Publication Data
US 2010/0011185 A1 Jan. 14, 2010

(30) Foreign Application Priority Data
Jul. 9, 2008 (JP) .................................. 2008-178607

(51) Int. Cl.
*G06F 12/00* (2006.01)
*G06F 13/00* (2006.01)
*G06F 13/28* (2006.01)

(52) U.S. Cl.
USPC ............ 711/171; 711/172; 711/203; 718/104

(58) Field of Classification Search
USPC .......................... 711/171, 203, 172; 718/104
See application file for complete search history.

(56) References Cited

U.S. PATENT DOCUMENTS

| 5,129,088 A * | 7/1992 | Auslander et al. ................. 711/1 |
| 2002/0073297 A1* | 6/2002 | Mizuno et al. ................. 711/202 |
| 2003/0204701 A1 | 10/2003 | Mimatsu et al. |
| 2005/0091455 A1 | 4/2005 | Kano et al. |
| 2007/0055713 A1 | 3/2007 | Nagai et al. |
| 2008/0034176 A1* | 2/2008 | Akutsu et al. ................. 711/162 |
| 2009/0100237 A1* | 4/2009 | Orikasa et al. ................. 711/162 |

FOREIGN PATENT DOCUMENTS

| JP | 2003-15915 | 1/2003 |
| JP | 2003 316618 | 11/2003 |
| JP | 2007 066259 | 3/2007 |

OTHER PUBLICATIONS

English Translation of Foreign Office Action issued on Sep. 11, 2012.

* cited by examiner

*Primary Examiner* — Stephen Elmore
*Assistant Examiner* — Mark Giardino, Jr.
(74) *Attorney, Agent, or Firm* — Brundidge & Stanger, P.C.

(57) ABSTRACT

A controller in a storage system receives a capacity change command specifying a device, and changes, to a volume capacity value indicating a storage capacity following the capacity change command, a volume capacity value of a virtual volume associated with the device specified in management information, which includes the volume capacity value indicating a storage capacity of the virtual volume. As such, without increasing or decreasing the number of logical volumes associated with a device provided by a host device, the device can be changed in storage capacity.

13 Claims, 16 Drawing Sheets

FIG. 5A

1113 VOLUME INFORMATION

| VOLUME # | PG # | IN-PG HEAD ADDRESS | VOLUME CAPACITY | VOLUME TYPE | VOLUME ATTRIBUTE | PAGE MANAGEMENT # | PAGE CAPACITY | THRESHOLD VALUE | NUMBER OF NOT-IN-USE PAGES |
|---|---|---|---|---|---|---|---|---|---|
| 1 | 1 | 0 GB | 700 GB | PHYSICAL | NOT IN USE | 0 | 0 | 0 | 0 |
| 2 | 1 | 700 GB | 200 GB | PHYSICAL | NOT IN USE | 0 | 0 | 0 | 0 |
| 3 | 2 | 0 GB | 150 GB | PHYSICAL | NOT IN USE | 0 | 0 | 0 | 0 |
| 7 | 3 | 20 GB | 10 GB | VIRTUAL | CAPACITY CHANGE NOT ALLOWED | 20 | 256 MB | 60% | 40 |
| 8 | 3 | 5 GB | 10 GB | VIRTUAL | PAIRED VOLUME | 10 | 512 MB | 100% | 35 |
| 9 | 0 | 0 | 0 | 0 | 0 | 0 | 0 | 0 | 0 |
| 10 | 3 | 0 GB | 3 GB | VIRTUAL | NOT IN USE | 1 | 256 MB | 50% | 11 |
| 11 | 4 | 0 GB | 300 GB | PHYSICAL | PAGE IN USE | 0 | 256 MB | 0 | 1199 |
| 12 | 4 | 300 GB | 1000 GB | PHYSICAL | PAGE IN USE | 0 | 256 MB | 0 | 3999 |

※ 0 IS NULL

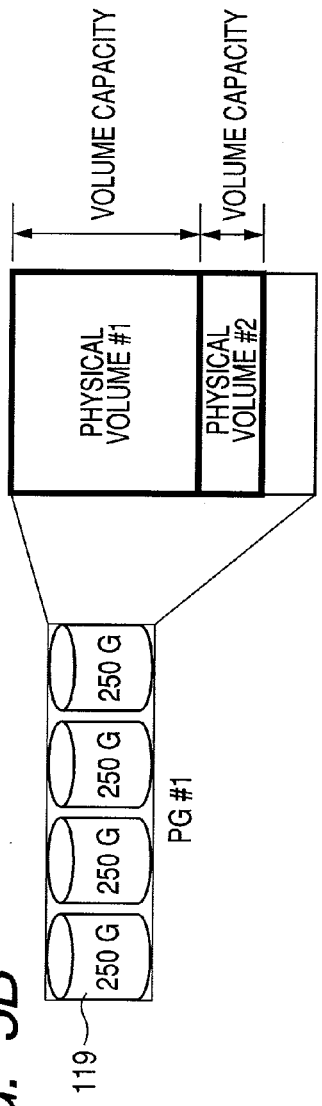

FIG. 5B

1112 PAGE INFORMATION

| PAGE # | VOLUME # | STATE OF PAGE USE |
|---|---|---|
| 1 | 11 | IN USE |
| 2 | 11 | NOT IN USE |
| 3 | 11 | NOT IN USE |
| 4 | 11 | NOT IN USE |
| ~ | | |
| 10 | 12 | IN USE |
| 11 | 12 | NOT IN USE |
| 12 | 12 | NOT IN USE |

FIG. 9A

1111 PAGE MANAGEMENT INFORMATION

| PAGE MANAGEMENT # | IN-USE PAGE # | | | NEXT PAGE MANAGEMENT # |
|---|---|---|---|---|
| 1 | 0 | 1 | 0 | 2 |
| 2 | 0 | 10 | 0 | 3 |
| 3 | 0 | 0 | 0 | 0 ⇒ 4 |
| 4 | 0 | 0 | 0 | 0 |
| 5 | 0 | 0 | 0 | 0 |

※ 0 IS NULL

FIG. 9B

1113 VOLUME INFORMATION

| VOLUME # | PG # | IN-PG HEAD ADDRESS | VOLUME CAPACITY | VOLUME TYPE | VOLUME ATTRIBUTE | PAGE MANAGEMENT # | PAGE SIZE | THRESHOLD VALUE | NUMBER OF NOT-IN-USE PAGES |
|---|---|---|---|---|---|---|---|---|---|
| 1 | 1 | 0 GB | 700 GB | PHYSICAL | NOT IN USE | 0 | 0 | 0 | 0 |
| 2 | 1 | 700 GB | 200 GB | PHYSICAL | NOT IN USE | 0 | 0 | 0 | 0 |
| 3 | 2 | 0 GB | 150 GB | PHYSICAL | NOT IN USE | 0 | 0 | 0 | 0 |
| 7 | 3 | 20 GB | 10 GB | VIRTUAL | CAPACITY CHANGE NOT ALLOWED | 20 | 256 MB | 60% | 40 |
| 8 | 3 | 5 GB | 10 GB | VIRTUAL | PAIRED VOLUME | 10 | 512 MB | 100% | 35 |
| 9 | 0 | 0 | 0 | 0 | | | | | |
| 10 | 3 | 0 GB | 3 GB ⇒ 4 GB | VIRTUAL | NOT IN USE | 1 | 256 MB | 50% | 11 |
| 11 | 4 | 0 GB | 300 GB | PHYSICAL | PAGE IN USE | 0 | 256 MB | 0 | 1199 |
| 12 | 4 | 300 GB | 1000 GB | PHYSICAL | PAGE IN USE | 0 | 256 MB | 0 | 3999 |

※ 0 IS NULL

FIG. 11A

1113 VOLUME INFORMATION

| VOLUME # | PG # | IN-PG HEAD ADDRESS | VOLUME CAPACITY | VOLUME TYPE | VOLUME ATTRIBUTE | PAGE MANAGEMENT # | PAGE SIZE | THRESHOLD VALUE | NUMBER OF NOT-IN-USE PAGES |
|---|---|---|---|---|---|---|---|---|---|
| 9 | 0 | 0 | 0 | | | 0 | | 0 | 0 |
| 10 | 3 | 0 GB | 3 GB ⇒ 2 GB | VIRTUAL | NOT IN USE | 1 | 256 MB | 50% | 11 |
| 11 | 4 | 0 GB | 300 GB | PHYSICAL | PAGE IN USE | 0 | 256 MB | 0 | 1199 |
| 12 | 4 | 300 GB | 1000 GB | PHYSICAL | PAGE IN USE | 0 | 256 MB | 0 | 3999 |

※ 0 IS NULL

FIG. 11B

1112 PAGE INFORMATION

| PAGE # | VOLUME # | STATE OF PAGE USE |
|---|---|---|
| 1 | 11 | IN USE |
| 2 | 11 | NOT IN USE |
| ⁓ | | |
| 10 | 12 | IN USE ⇒ NOT IN USE |
| 11 | 12 | NOT IN USE |
| 12 | 12 | NOT IN USE |

FIG. 11C

1111 PAGE MANAGEMENT INFORMATION

| PAGE MANAGEMENT # | IN-USE PAGE # | | NEXT PAGE MANAGEMENT # |
|---|---|---|---|
| 1 | 0 | 1 | 2 |
| 2 | 0 | 0 | 0 |
| 3 | 10 ⇒ 0 | 0 | 3 ⇒ 0 |
| 4 | 0 | 0 | 0 |
| 5 | 0 | 0 | 0 |

※ 0 IS NULL

FIG. 15A

NO CAPACITY INCREASE OF LU #200

<REASON>
........

FIG. 15B

CAPACITY INCREASE OF LU #200

(CAPACITY OF LU #200 IS INCREASED FROM 3GB TO 4GB)

FIG. 15C

NO CAPACITY REDUCTION OF LU #200

<REASON>
........

FIG. 15D

CAPACITY REDUCTION OF LU #200

(CAPACITY OF LU #200 IS REDUCED FROM 3GB TO 2GB)

STORAGE SYSTEM AND METHOD FOR STORAGE CAPACITY CHANGE OF HOST-DEVICE-SPECIFIED DEVICE

CROSS-REFERENCES TO RELATED APPLICATIONS

This application relates to and claims priority from Japanese Patent Application No. P2008-178607, filed on Jul. 9, 2008, the entire disclosure of which is incorporated herein by reference.

BACKGROUND OF THE INVENTION

1. Field of the Invention

The present invention relates to storage capacity change of devices specified by a host device.

2. Description of the Related Art

A well-known logical volume is of a type dynamically allocated with a substantial area in accordance with an increase or decrease of the number of the substantial areas allocated to the logical volume. Such a logical volume is hereinafter referred to as "virtual volume". An example includes Patent Document 1 (JP-A-2003-015915). With the technology of this type, out of the storage capacity of a virtual volume, the storage capacity of one or more substantial areas allocated to the virtual volume is entirely configured from the physical storage space of a storage system. Such entire storage capacity of the substantial areas(s) is referred to as "substantial capacity". The substantial capacity of the virtual volume is changed in accordance with an increase or decrease of the number of the substantial areas allocated to the virtual volume. Note here that the physical storage space is a storage space provided by a parity group (hereinafter, sometimes referred to as "PG"). The PG is configured by one or more physical storage devices, e.g., hard disk drive or flash memory.

A storage system can be generally configured mainly by a controller and a storage device group. The storage device group is configured by one or more physical storage devices described above. The controller provides devices to a host device, e.g., a host or any other controller, and such devices are exemplified by logical units (LUs). The LUs are respectively associated with logical volumes under the management of the controller. When the host device forwards an access request, i.e., write request or read request, with a specification of LU, any logical volume associated with the LU is accessed. The logical volume associated with the LU as such may be virtual or general. The general volume is a logical volume formed based on the above-described physical storage space.

The controller may be provided with a capacity change command, i.e., command for increasing or reducing the storage capacity, with a specification of LU from the host device or any other device. The storage capacity of the LU notified to the host is generally the storage capacity of the logical volume associated with the LU. Therefore, changing the storage capacity of the LU means generally to change the storage capacity of the logical volume associated with the LU.

The concern here is that the technology of changing the storage capacity of a logical volume itself has not yet been proposed.

In consideration thereof, in response to a capacity change command, the controller increases or decreases the number of the logical volumes associated with any specified LU, thereby changing the capacity of the LU. With a specific example of FIG. 1, when a capacity increase command specifying an LU#100 is provided, in response thereto, the controller increases the number of the general volumes associated with the LU#100 from 1 to 3. More in detail, the controller combines the general volumes #2 and #3 to the general volume #1 associated with the LU #100. This accordingly enables to increase the storage capacity of the LU while the host device is being in operation.

However, this technology has the following problems.

1. The capacity change is made in accordance with an increase or decrease of the number of the general volumes associated with an LU.

2. At the time of capacity increase, there may be a case where there is no general volume. If this is the case, there needs to be a newly created general volume(s).

Such problems are those observed when logical volumes associated with the LU are general volumes. However, even if general volumes are replaced with virtual volumes, similar problems may occur.

SUMMARY OF THE INVENTION

In consideration thereof, an object of the invention is to enable storage capacity change of a device to be provided to a host device without increasing or decreasing the number of logical volumes associated therewith.

A controller in a storage system receives a capacity change command with a device specification, and in management information including a volume capacity value representing the storage capacity of a virtual volume, changes the volume capacity value of the virtual volume associated with the specified device to a value representing the storage capacity following the capacity volume change command.

BRIEF DESCRIPTION OF THE DRAWINGS

FIG. 5A shows an exemplary configuration of volume information;

FIG. 5B shows a physical PG and a physical volume formed based on a storage space of the physical PG;

FIG. 9A shows page management information before and after update in S804;

FIG. 9B shows volume information before and after update in S805;

FIG. 11A shows volume information before and after update in S1004;

FIG. 11B shows page information before and after update in S1005;

FIG. 11C shows page management information before and after update in S1005 and S1006;

FIG. 15A shows an exemplary screen to be displayed in S808 of FIG. 8;

FIG. 15B shows an exemplary screen to be displayed in S807 of FIG. 8;

FIG. 15C shows an exemplary screen to be displayed in S1009 of FIG. 10;

FIG. 15D shows an exemplary screen to be displayed in S1008 of FIG. 10;

DESCRIPTION OF THE PREFERRED EMBODIMENT

In an embodiment of the present invention, a host device is a host, and a device to be provided to the host is presumably an LU (Logical Unit).

Figure 1:
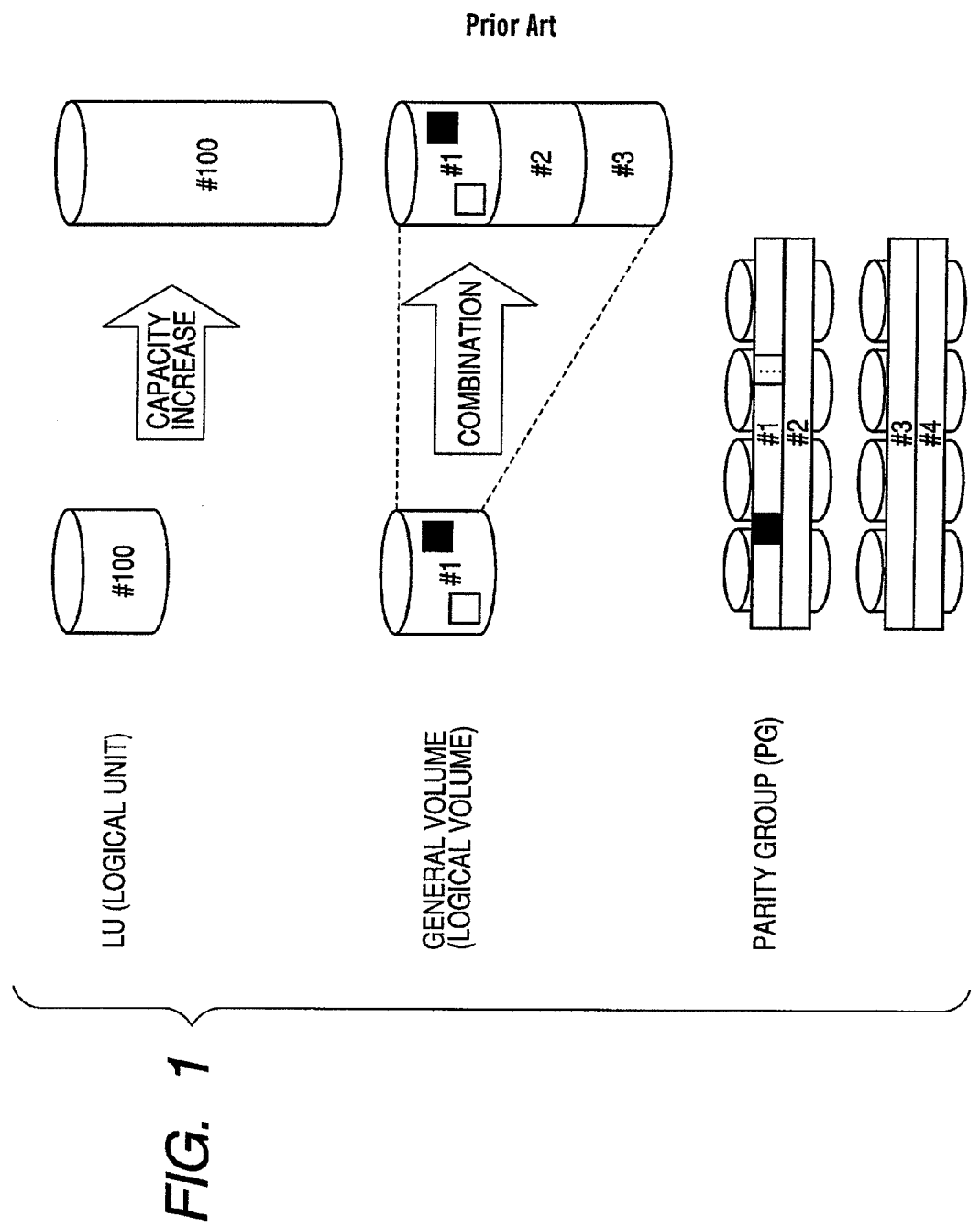
FIG. 1 shows the concept of a method for storage capacity change of an LU.
Figure 2:
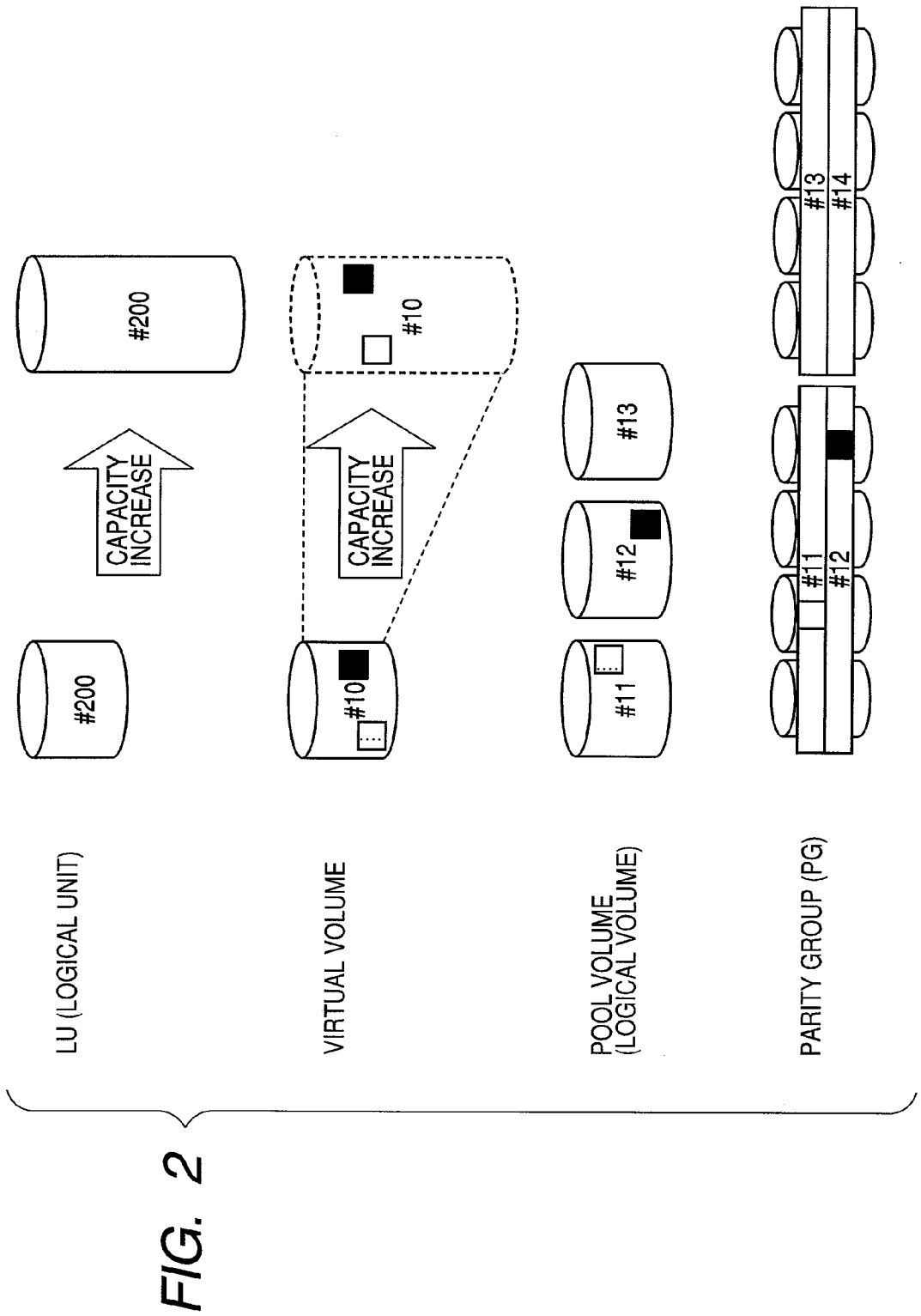
FIG. 2 shows the outline of the storage capacity change of the LU in an embodiment of the invention.

FIG. 2 shows the outline of storage capacity change of an LU in an embodiment of the invention.

In this embodiment, the storage capacity of an LU is changed not by increasing or decreasing the number of virtual volumes associated with the LU but by changing the storage capacity of the virtual volume(s) itself associated with the LU.

To be specific, as shown in FIG. 2, for example, it is assumed is that a virtual volume #10 is associated with an LU #200 in a state ready to be specified by an access request from the host, e.g., LU whose storage capacity, etc., has been notified to the host in response to an inquiry command. The virtual volume #10 is allocated with any two of a plurality of substantial areas configuring pool volumes #11 to #13, i.e., logical volumes not being able to be provided to the host. These two substantial areas are those blocks in gray and black of FIG. 2. These substantial areas each store data in accordance with a write request specifying the LU #200. The pool volumes #11 to #13 are each a logical storage device formed based on two parity groups.

In this state, when receiving a capacity increase command specifying the LU #200, the controller increases the storage capacity of the virtual volume #10 associated with the LU #200 to be a value following the capacity increase command. Even if the virtual volume #10 is increased in storage capacity as such, any substantial areas already allocated to the virtual volume #10 are not susceptible to any influence. The capacity increase command may specify the storage capacity after the capacity increase, or the storage capacity for addition to the storage capacity before the capacity increase.

As such, the storage capacity of the virtual volume #10 can be increased in units different from those of the storage capacity of the virtual volume #10 before the capacity increase or the storage capacity of any other logical volume, e.g., general or virtual volume. For example, the storage capacity of the virtual volume #10 can be increased in units of a segment of the virtual volume #10 that will be described later.

Moreover, because the storage capacity of the virtual volume #10 itself is increased, increasing the storage capacity of an LU is not requiring a plurality of virtual volumes. Therefore, for increasing the storage capacity of the virtual volume #10, there is no need to newly create a logical volume.

This is the outline of the embodiment. Note that, although FIG. 2 shows an example of increasing the storage capacity of the virtual volume #10, the storage capacity thereof can be reduced in units different from those of the storage capacity of the virtual volume #10 before the capacity reduction or the storage capacity of any other logical volume, e.g., general or virtual volume. For example, the storage capacity of the virtual volume #10 can be reduced in units of a segment of the virtual volume #10 that will be described later. This is because the storage capacity of the virtual volume #10 itself is reduced.

Note that, in the description below, presumably, a virtual volume is configured by a plurality of segments, and each of the segments is configured by a plurality of virtual areas. Hereinafter, a substantial area allocated to a virtual area is referred to as "page".

Figure 3:
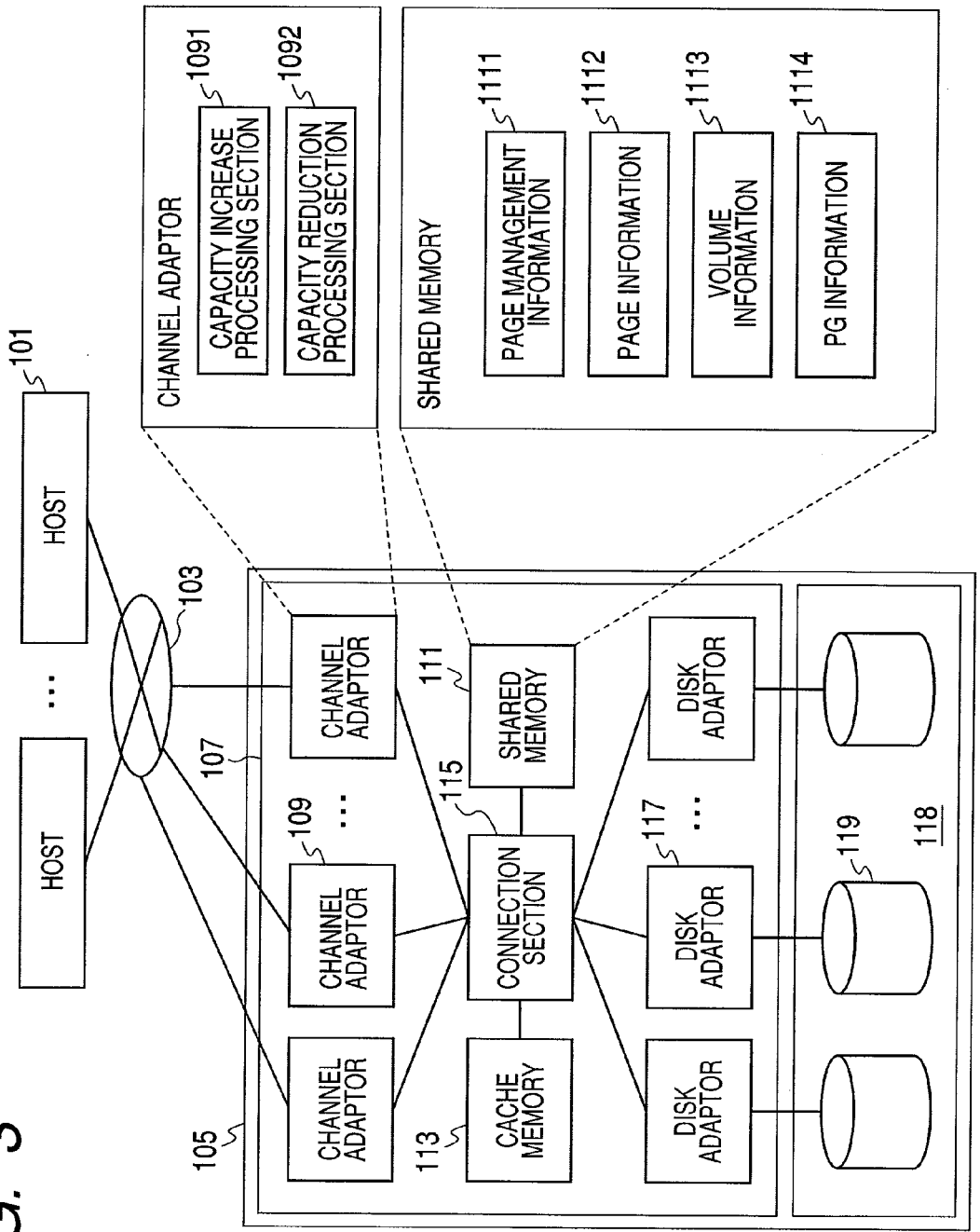
FIG. 3 shows the configuration of a computer system in the embodiment of the invention.

FIG. 3 shows the configuration of a computer system in the embodiment of the invention.

A communications network, e.g., SAN (Storage Area Network) 103 is connected with one or more hosts 101, and a storage system 105.

The host 101 is a computer provided with information processing resources such as CPU (Central Processing Unit) and memory, and is exemplified by a personal computer, a work station, a main frame, and others.

The storage system 105 can be configured as a RAID (Redundant Arrays of Inexpensive Disks) system including a plurality of physical storage devices 119 arranged in an array, for example. This is surely not restrictive, and the storage system 105 may be configured as an advanced intelligent fiber channel switch, for example. The storage system 105 can be mainly configured by a controller 107, and a storage device group 118.

The controller 107 is configured to include channel adaptors (CHAs) 109, disk adaptors (DKAS) 117, a cache memory 113, a shared memory 111, and a connection section 115, for example.

The CHA 109 is an interface device for data communications with the host 101 (or any other storage system). The CHA 109 can be configured as a microcomputer system, e.g., circuit board, including a CPU, a memory, a plurality of communications ports, and others, for example. As to the communications ports, some are connected to the hosts 101 (or any other storage systems), and some are connected to the connection section 115. For example, the CHA 109 is capable of receiving a write request from the host 101, writing data in accordance with the received write request into the cache memory 113, and instructing the DKA 117 for writing of the data. The CHA 109 is also capable of receiving a read request from the host 101, instructing the DKA 117 for reading of data in accordance with the received read request, and reading thus requested data from the cache memory 113 for transmission to the host 101.

In this embodiment, the CHA 109 includes a capacity increase processing section 1091, and a capacity reduction processing section 1092. These processing sections 1091 and 1092 are implemented by the CPU in the CHA 109 running a computer program. Note that instead of or in addition to the CHAs 109, the capacity increase processing section 1091 and the capacity reduction processing section 1092 may be provided to each of the DKAs 117.

The DKA 117 is an interface device that performs data communications with the physical storage device 119. The DKA 117 can also be configured as a microcomputer system, e.g., circuit board, provided with a CPU, a memory, a plurality of communications ports, and others. As to the communications ports, some are connected to the physical storage devices 119, and some are connected to the connection section 115. For example, in response to a writing command from the CHA 109, the DKA 117 can write the data stored in the cache memory 113 into the physical storage device 119. In response to a reading command coming from the CHA 109, the DKA 117 can also read the requested data from the physical cal storage device 119 for writing into the cache memory 113.

The cache memory 113 is a volatile (or nonvolatile) memory, for example, and temporarily stores data received from the host computer 10, and data read from the physical storage device(s) 119.

The shared memory 111 is a volatile (or nonvolatile) memory, for example, and stores information to be referred to by the CHAs 109 or the DKAs 117 for control over the storage system 105. Such information is hereinafter referred to as control information. The control information includes the following five types of information.

1. LU management information (not shown): information indicating which logical volume is associated with which LU, e.g., information including LUNs (Logical Unit Numbers) being the number of the LUs, and numbers of the logical volumes (volume #) associated with the LUs.

2. Page management information 1111: information indicating which page is allocated to which of a plurality of virtual areas and where configuring segments of a virtual volume (segments are storage areas configuring a virtual volume).

3. Page information 1112: information indicating which page is included in which pool volume and in what state of use.

4. Volume information 1113: information including various types of information about each logical volume.

5. PG information 1114: information including various types of information about each PG.

The connection section 115 establishes a connection among the CHAs 109, the DKAs 117, the cache memory 113, and the shared memory 111. The connection section 115 can be configured as a high-speed bus, e.g., ultra-high-speed crossbar switch, performing data transfer by the high-speed switching operation, for example.

The storage device group 118 includes a plurality of physical storage devices 119. The physical storage devices 119 can be each a device such as hard disk, flexible disk, magnetic tape, semiconductor memory (e.g., flash memory), and optical disk. Two or more of such physical storage devices 119 can configure a parity group of a predetermined RAID level (may be referred to as "RAID group" or "array group"). Using the storage space of two or more of the physical storage devices 119 configuring a parity group (hereinafter, sometimes simply referred to as "PG"), a logical volume with material substance (physical volume) can be formed. The physical volume includes the above-described general volume and pool volume, for example. Any of a plurality of pages configuring a pool volume is allocated to a virtual area in a virtual volume.

This is the configuration of a computer system of the embodiment. Note that the configuration of the computer system is no more than an example, and any other configuration will also surely do. As an alternative configuration, the shared memory 111 and the cache memory 113 may not be necessarily provided separately, and a memory may include a shared memory area and a cache memory area. Still alternatively, the controller 107 may be a circuit board including a CPU, a memory, and a plurality of communications ports, i.e., can be of a simple configuration compared with the controller 107 of FIG. 3. If this is the configuration, the CPU may execute the processes instead of a plurality of CHAs and DKAs.

Described in detail below are the PG information 1114, the volume information 1113, the page information 1112, and the page management information 1111. These information 1111 to 1114 are each a table, for example.

Figures 4A, 4B, 4C:
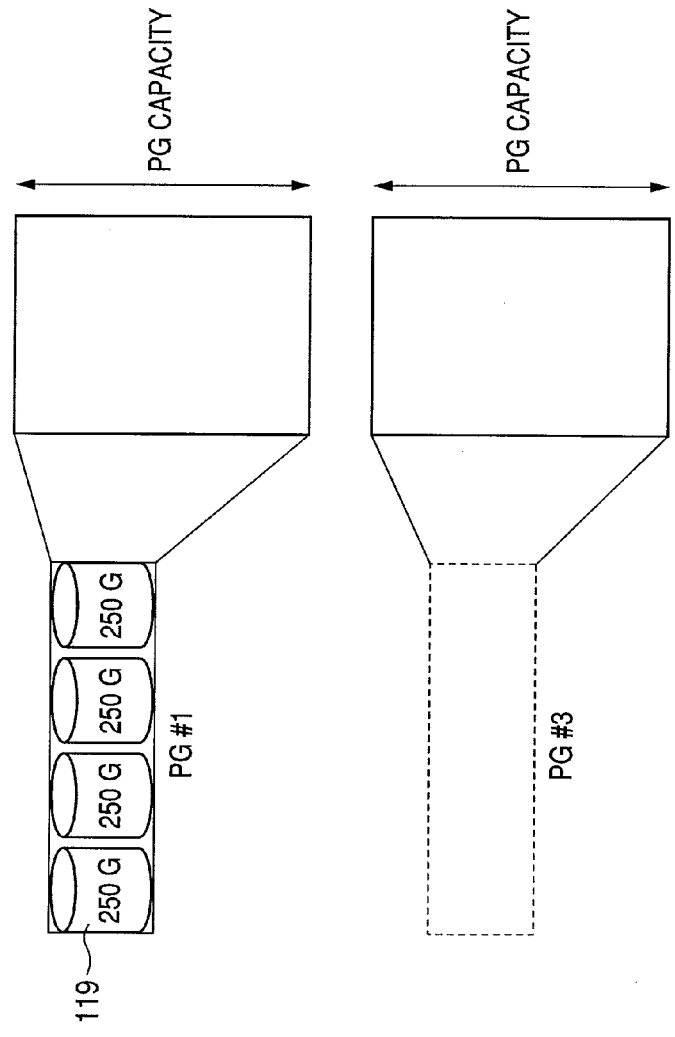
FIG. 4A shows an exemplary configuration of parity group (PG) information.
FIG. 4B shows a physical PG.
FIG. 4C shows a virtual PG.

FIG. 4A shows an exemplary configuration of the PG information 1114.

The PG information 1114 is recorded with, on a PG basis, a PG#, a PG capacity, the number of storage devices, and a PG type. The PG# indicates a number for uniquely identifying a PG, the PG capacity indicates the storage capacity of the PG, the number of storage devices indicates the number of physical storage devices configuring the PG, and the PG type indicates the type of the PG. The PG type includes "physical" and "virtual", for example.

As shown in FIG. 4B, the PG under the PG type of "physical" is the one configured by a plurality of physical storage devices 119. Based on the storage space of this PG, i.e., in the range of storage capacity of this PG, a physical volume is formed, e.g., general volume and/or pool volume.

On the other hand, as shown in FIG. 4C, the PG under the PG type of "virtual" is the one being virtual. Based on the storage space of this PG, i.e., in the range of storage capacity of this PG, a virtual volume is formed (typically a virtual volume following the Thin Provisioning technology).

FIG. 5A shows an exemplary configuration of the volume information 1113.

The volume information 1113 is recorded with, on a logical volume basis, a volume#, a PG#, an in-PG head address, a volume capacity, a volume type, a volume attribute, a page management#, a page capacity, a threshold value, and the number of not-used pages. The volume# indicates a number for uniquely identifying a logical volume, and the PG# indicates the number of a PG including the logical volume). The in-PG head address indicates the head address of the logical volume in the PG, and the volume capacity indicates the storage capacity of the logical volume.

The volume type indicates the type of the logical volume, and specifically includes "physical" and "virtual", for example. Any logical volume under the volume type of "physical" is a physical volume. Any logical volume under the volume type of "virtual" is a virtual volume.

The volume attribute indicates the attribute of a logical volume, and specifically includes "not in use", "capacity change not allowed", "paired volume" and "page in use". Any logical volume under the volume attribute of "not in use" is not used as a volume no matter if it is associated with an LU or not. Any logical volume under the volume attribute of "capacity change not allowed" is a virtual volume not allowed for storage capacity change. Any logical volume under the volume attribute of "paired volume" is a component of the volume pair, and is a copy-source volume or a copy-destination volume. Any logical volume under the volume attribute of "page in use" is a pool volume.

The page management# corresponds to a head segment of the logical volume being virtual. FIG. 5A shows that, for example, to the head segment of a virtual volume #10, i.e., logical volume under the volume# of 10 with the volume type of "virtual", the page management number# of 1 is corresponding. Using the page management#1, referring to the page management information 1111 of FIG. 7A can identify the page allocated to the virtual area being an access destination for the virtual volume #10. The details thereof will be described later.

The page capacity indicates the storage capacity of a virtual area or a page. Therefore, for a virtual or pool volume, any value considered effective as the page capacity is set to the volume information 1113. In this embodiment, a page is allocated to a virtual area having the same page capacity.

The threshold value indicates a threshold ratio of the entire capacity of one or more virtual areas not yet allocated with a page to the entire capacity of one or more pages not yet allocated to a virtual area. Therefore, for a virtual volume, any value considered effective as a threshold value is set to the volume information 1113.

The number of not-used pages indicates the number of virtual areas not yet allocated with a page, or the number of the pages not yet allocated to a virtual area. Therefore, for a virtual volume or a pool volume, any value considered effective as the number of not-used pages is set to the volume information 1113.

FIG. 5A shows that a physical volume #1 is a portion of storage space having the storage capacity of 700 GB (GigaByte) of a physical PG #1, from the head address (0 GB-th address) to the address of 700 GB-th as shown in FIG. 5B, and a physical volume #2 is a portion of storage space having the storage capacity of 200 GB of the same physical PG #1, from the 700 GB-th address to 900 GB-th address. FIG. 5A also shows that each of the virtual areas configuring a virtual volume #7 has the storage capacity of 256 MB (MegaBytes), and in the virtual volume #7, the number of the virtual areas not yet allocated with a page is 40. FIG. 5A also shows that each of the pages configuring a pool volume #11 has the storage capacity of 256 MB, and in the pool volume #11, the number of pages not yet allocated to a virtual area is 1199.

Figures 6A, 6B:
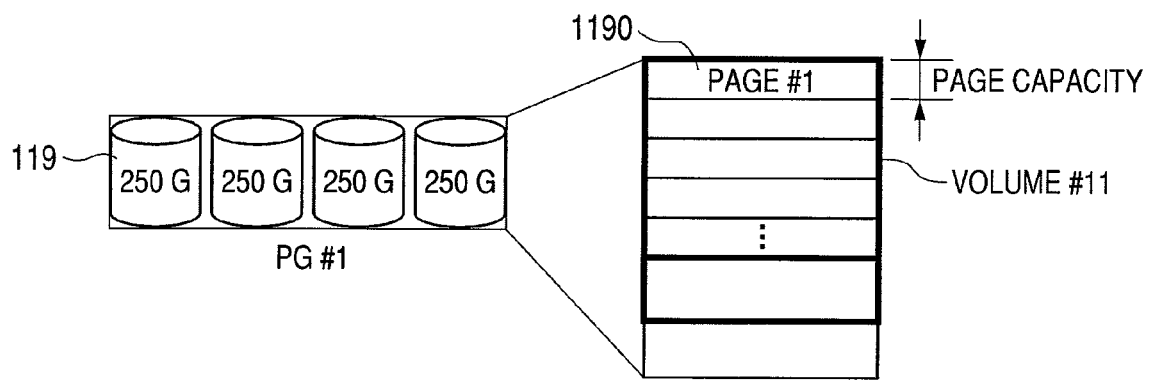
FIG. 6A shows an exemplary configuration of page information.
FIG. 6B shows a physical PG, a pool volume formed based on a storage space thereof, and pages configuring the pool volume.

FIG. 6A shows an exemplary configuration of the page information 1112.

The page information 1112 is recorded with, on a page basis, a page#, a volume#, and a state of page use. The page# indicates a number for uniquely identifying a page, and the volume# indicates the number of a pool volume including the page. The state of page use includes "in use" indicating that the page is allocated to a virtual area, and "not in use" indicating that the page is not allocated to any of the virtual areas.

FIG. 6A shows that a page #1 (page with the page# of 1) is located in the pool volume #11 as shown in FIG. 6B, for example. About the pool volume #11, referring to the volume information 1113 of FIG. 5A tells that the page #1 has the storage capacity of 256 MB, and the pool volume #11 is located in the PG #1.

Figures 7A, 7B:
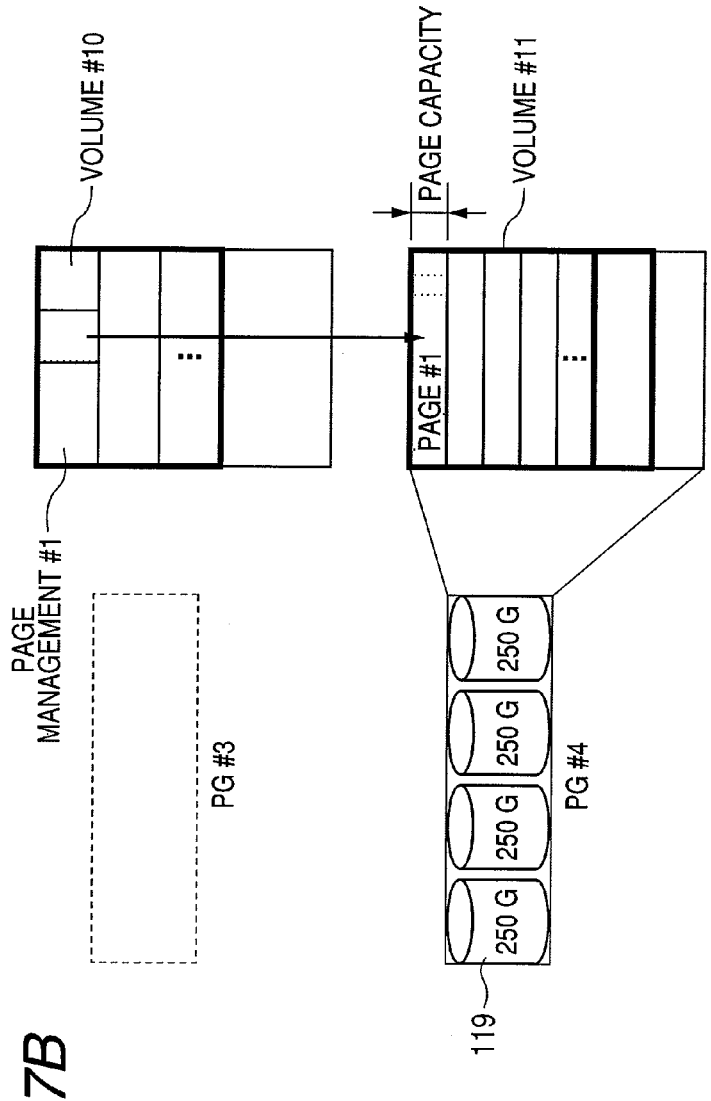
FIG. 7A shows an exemplary configuration of page management information.
FIG. 7B shows page allocation with respect to virtual areas configuring a segment.

FIG. 7A shows an exemplary configuration of the page management information 1111.

In the page management information 1111, records are each recorded with a page management#, an in-use page#, and a next page management#. The page management# is a number, in other words, for uniquely identifying each record in the page management information 1111. The in-use page# indicates the number of a page allocated to a virtual area in a segment corresponding to the record. The next page management# is a pointer to the next record, i.e., in other words, a page management# corresponding to the next segment.

In FIG. 7A, a storage area configured by four virtual areas, e.g., each has the storage capacity of 256 MB, is a segment, e.g., storage capacity of 1 GB. In FIG. 7A, in each of the records, four cells under the in-use page# are respectively corresponding to the four virtual areas. These cells are arranged in order same as that for the virtual areas. FIG. 7A shows that, in the record under the page management# of 1, the third cell in the in-use page# is set with "1" as a page#, and the volume information 1113 of FIG. 5A shows that the page management#1 is corresponding to the head segment of the virtual volume #10. As shown in FIG. 7B, it is thus known that the third virtual area in the head segment of the virtual volume #11, i.e., virtual volume in the virtual PG #3, is allocated with the page #1 in the pool volume #11, i.e., physical volume in the physical PG #4. In FIG. 5A, it is also known that the virtual volume #10 is configured by three segments because 1. the virtual volume #10 has the storage capacity of 3 GB, and
2. the virtual area of the virtual volume #10 has the capacity of "256 MB", and because four virtual areas configure one segment, the segment in the virtual volume #10 has the storage capacity of 1 GB (256 MB×4). On the other hand, using the page management#1, referring to the page management information 1111 of FIG. 7A tells that the virtual volume #10 is configured by three segments because the page management#2 and 3 are identified in order based on the next page management#, and the record corresponding to the page management#3 shows the next page management# of 0.

Described below are write and read processes with respect to a virtual volume.

Figure 13:
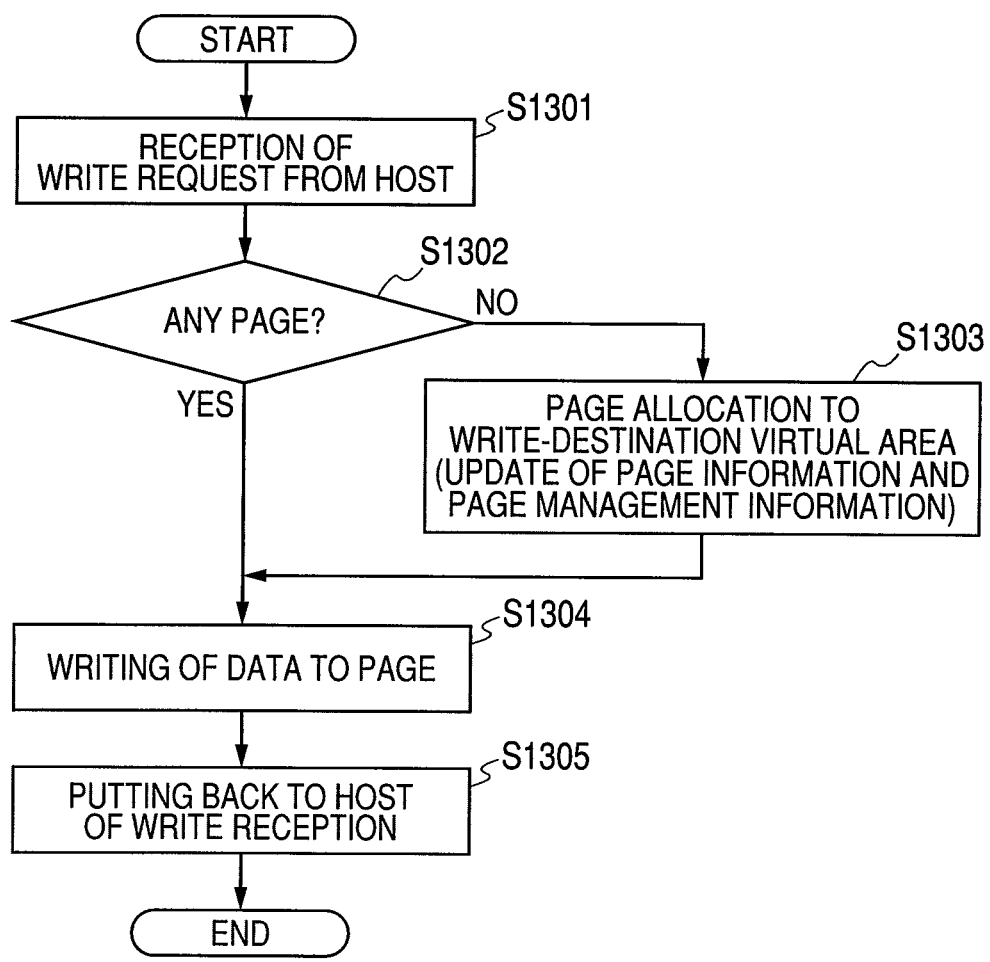
FIG. 13 is a flowchart of a write process with respect to a virtual volume.

FIG. 13 is a flowchart of a write process with respect to a virtual volume.

The write process is executed by a write processing section (not shown) provided in each of the CHAs 109. The write processing section is implemented by the CPU in the CHA 109 running a computer program.

When receiving a write request from the host 101 (S1301), the write processing section goes through the processes of S1302 and thereafter. The write request here is the one specifying an LU associated with any of the virtual volumes. A determination about whether the LUN of the LU specified by thus provided write request is associated with a volume# of the virtual volume or not can be made by referring to the LU management information and the volume information 1113 described above.

The write processing section determines whether or not any page is allocated to a virtual area represented by the address specified by the write request, i.e., write-destination virtual area (S1302). The determination about whether any page is allocated to such a write-destination virtual area or not can be made by referring to the volume information 1113 and the page management information 1111. To be specific, for example, the write processing section tracks the page management information 1111 using the page management# corresponding to the virtual volume associated with the write-destination LU, i.e., the page management# in the volume information 1113, thereby identifying the cell corresponding to the write-destination virtual area. Thereafter, a determination about whether any page is allocated to the write-destination virtual area or not can be made depending on whether the cell is set with any effective page# or not.

When the determination result of S1302 is positive (S1302: YES), the write processing section writes, into the page allocated to the write-destination virtual area, data following the write request received in S1301 (S1304). Thereafter, the write processing section forwards a notification of write request reception back to the host 101 (S1305).

On the other hand, when the determination result of S1302 is negative (S1302: NO), the write processing section identifies any not-yet-allocated page by referring to the page information 1112, and then allocates thus identified page to the write-destination virtual area (S1303). To be specific, the write processing section writes the page# of thus identified not-yet-allocated page to the cell corresponding to the write-destination virtual area, i.e., cell in the page management information 1111, and updates the state of page use of the not-yet-allocated page from "not in use" to "in use", i.e., the state of page use in the page information 1112. Thereafter, the processes S1304 and S1305 described above are to be executed.

Figure 14:
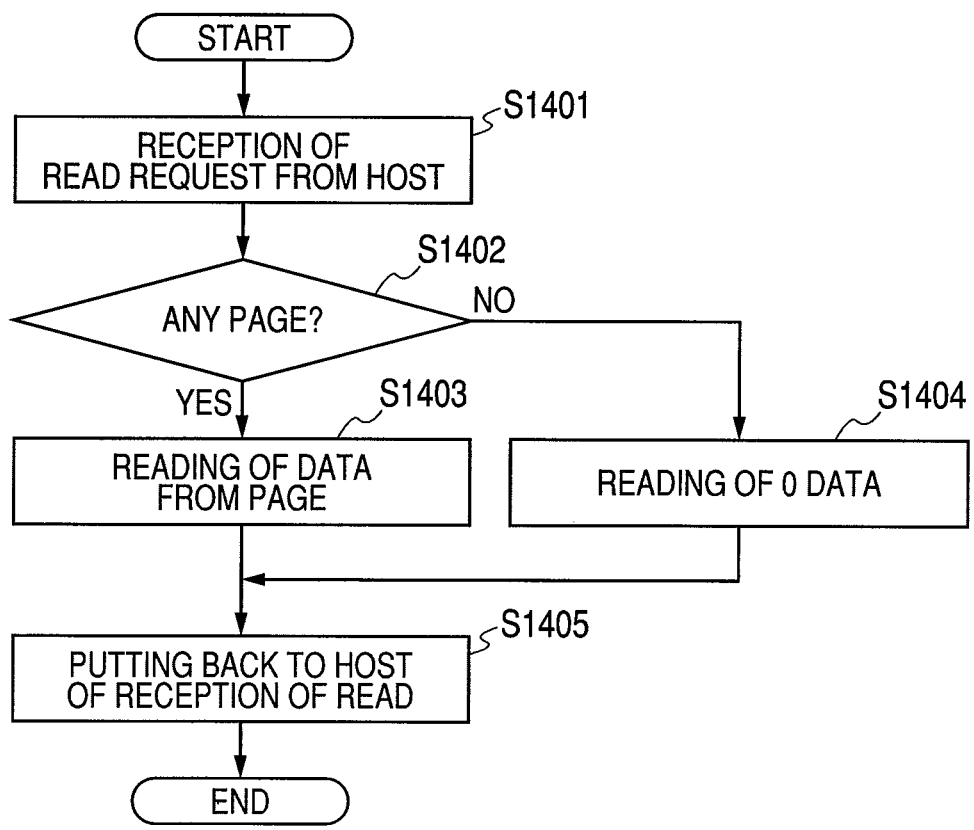
FIG. 14 is a flowchart of a read process with respect to a virtual volume.

FIG. 14 is a flowchart of a read process with respect to a virtual volume.

The read process is executed by a read processing section (not shown) provided in each of the CHAs 109. The read processing section is implemented by the CPU in the CHA 109 running a computer program.

When receiving a read request from the host 101 (S1401), the read processing section goes through the processes of S1402 and thereafter. The read request here is the one specifying an LU associated with any of the virtual volumes.

The read processing section determines whether or not any page is allocated to a virtual area represented by the address specified by the provided read request, i.e., read-source virtual area (S1402).

When the determination result of S1402 is positive (S1402: YES), the read processing section reads data from the page allocated to the read-source virtual area (S1403). Thereafter, the read processing section forwards a notification of read request reception, e.g., data being a reading result, put back to the host 101 (S1405).

On the other hand, when the determination result of S1402 is negative (S1402: NO), the read processing section reads 0 data, i.e., data configured by values of "0" (S1404). The 0 data is stored in a predetermined storage area, e.g., memory in each of the CHAs 109, the shared memory 111, or the cache memory 113, and when the determination result of S1402 is NO, the data "0" is read from the predetermined storage area. Thereafter, in S1405, the 0 data is put back to the host 101, for example.

In this embodiment, as described above, the storage capacity of a virtual volume itself can be changed. Because the head address in the virtual volume is fixed, i.e., because the in-PG head address in the volume information 1113 is fixed, when the end address in the virtual volume is increased or decreased in value, e.g., when the end address is increased or decreased in value in units of a segment, the storage capacity of the virtual capacity can be changed.

For appropriately changing the storage capacity of a virtual volume, such a change is made in the following procedure. The process of changing the storage capacity of a virtual volume includes a capacity increase process and a capacity reduction process. The capacity increase process is executed by the capacity increase processing section 1091, and the capacity reduction process is executed by the capacity reduction processing section 1092. These processes will be respectively described below. Note that, in the description that follows, presumably, a virtual volume to be changed in storage capacity is the virtual volume #10, and the virtual volume #10 has the storage capacity of 3 GB as shown in FIG. 5A. Also an LU associated with the virtual volume #10 is the LU #200 as shown in FIG. 2.

Figure 8:
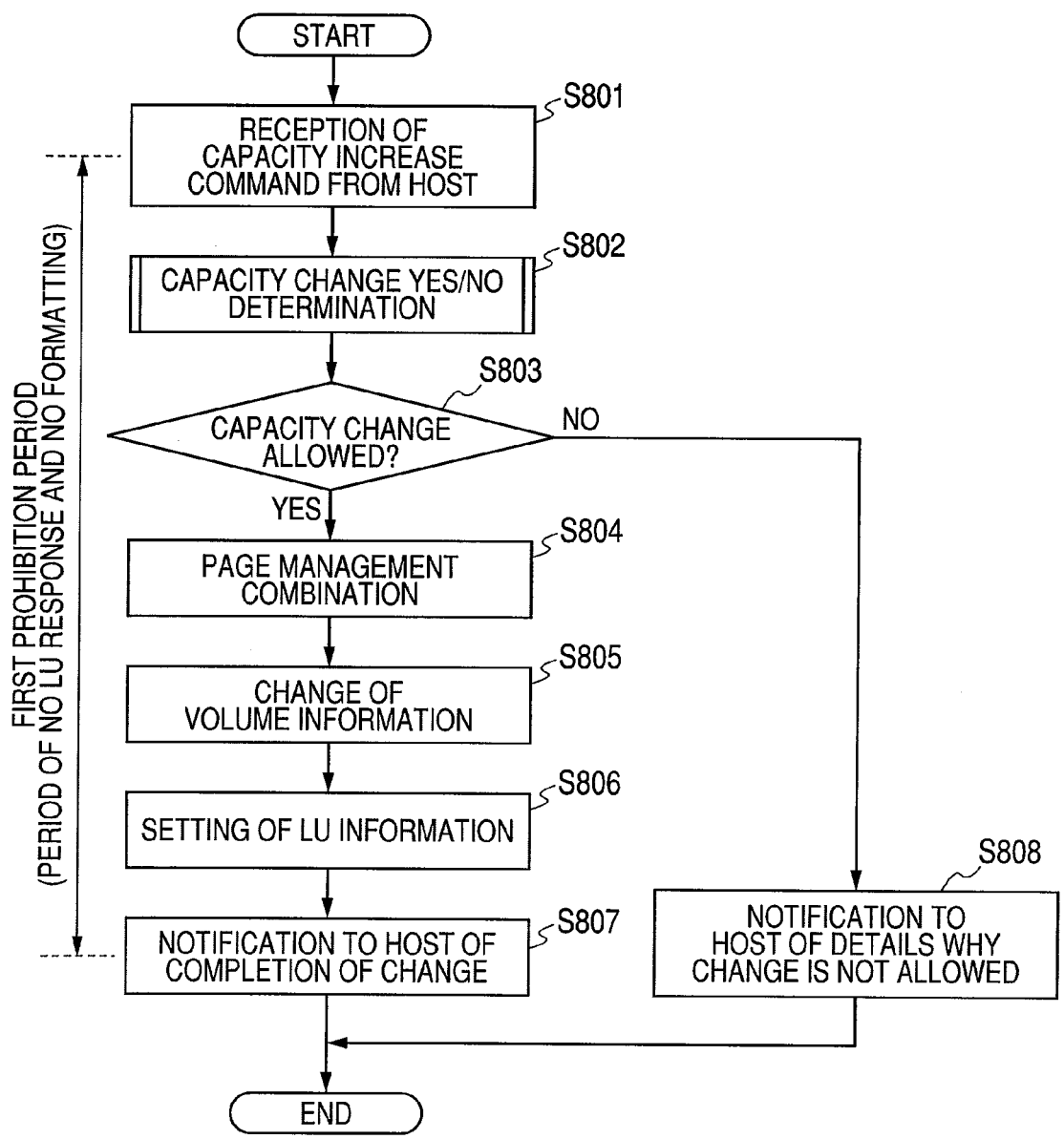
FIG. 8 is a flowchart of a capacity increase process.

FIG. 8 is a flowchart of the capacity increase process.

The capacity increase processing section 1091 receives a capacity increase command specifying the LU #200 from the host 101 (S801). As described above, referring to the LU management information and the volume information 1113 tells that the logical volume associated with the LU #200 is the virtual volume #10. Thus received capacity increase command is for increasing the capacity from 3 GB to 4 GB.

The capacity increase processing section 1091 makes a determination about whether or not to allow capacity change (S802). The flow of such a capacity change YES/NO determination will be described later by referring to FIG. 12.

When the determination result of S802 tells that the capacity change is not allowed (S803: NO), the capacity increase processing section 1091 notifies the host 101 of the details of the result (S808). As a result, the host 101 displays on its display device a screen exemplified in FIG. 15A, e.g., a screen showing a message telling that no capacity increase is allowed, and the reason why.

On the other hand, when the determination result of S802 tells that the capacity change is allowed (S803: YES), the capacity increase processing section 1091 goes through the processes of S804 to S807.

That is, first of all, the capacity increase processing section 1091 performs page management combination (S804). The page management combination means to combine the segment equal to the increase of the storage capacity to the end segment of the virtual volume #10. To be specific, as shown in FIG. 9A, in the page management information 1111, the capacity increase processing section 1091 updates the next page management# of the record corresponding to the last segment of the virtual volume #10, i.e., the record with the page management#3. That is, the next page management# is updated from a null value "0" meaning it is the last segment to the page management#4 of the record corresponding to the segment equal to the increase of the storage capacity, i.e., a segment because the increase of the storage capacity is 1 GB. As such, by updating the next page management# of the record corresponding to the combining segment, the virtual volume #10 is combined with, at the end thereof, the segment (s) equal in number to the increase of the storage capacity.

Thereafter, the capacity increase processing section 1091 changes the volume information 1113 (S805), i.e., in the volume information 1113, the volume capacity of the virtual volume #10 is updated. To be specific, as shown in FIG. 9B, in accordance with the capacity increase command received in S801, the volume capacity of the virtual volume #10 is updated from "3 GB" to "4 GB".

Next, the capacity increase processing section 1091 sets LU information as a notification target to the host (S806). The LU information includes information indicating the storage capacity of the LU #200 after the capacity increase, i.e., 4 GB. When a predetermined inquiry command comes from the host 101 sometime later, for example, the LU information is notified to the host 101 in response to the inquiry command.

Lastly, the capacity increase processing section 1091 notifies the host 101 of completion of storage capacity change (S807). As a result, the host 101 displays, on its display device, a screen exemplified in FIG. 15B, e.g., a screen showing a message telling that the storage capacity of the LU #200 is increased from 3 GB to 4 GB.

This is the end of the description about the capacity increase process. In the capacity increase process, as described in the foregoing, after the page management combination is performed, i.e., after the page management information 1111 is updated, the volume information 1113 is updated. In other words, after the number of the segments configuring the virtual volume #10 is increased, the information indicating the storage capacity of the virtual volume #10, i.e., volume capacity, is updated.

Note that, during the capacity increase process, i.e., during the processes from S801 to S807 or S808, as shown in FIG. 8, for the LU #200 being the target of capacity increase, no LU response and formatting is allowed, i.e., first prohibition period. The LU response means a response against a predetermined inquiry command specifying the LU #200, specifically, a response about the storage capacity of the LU #200. When receiving a capacity increase command specifying the LU #200, the capacity increase processing section 1091 sets, in a predetermined storage area, e.g., shared memory 111, information telling that the LU #200 is now in the first prohibition period.

In the first prohibition period, even if any of the CHAs 109 receives a predetermined inquiry command specifying the LU #200 from host 101, from the information set to the predetermined storage area described above, the LU #200 is specified as being in the first prohibition period. Therefore, the CHA 109 or any other CHA 109 provided with the inquiry command makes no response there against to the host 101 about the storage capacity of the LU #200. Specifically, as a response against the inquiry command, busy or error, e.g., error supported by an SCSI (Small Computer Systems Interface), is returned to the host 101.

Similarly, in the first prohibition period, even if any of the CHAs 109 receives a format command specifying the LU #200 from the host 101, from the information set to the predetermined storage area described above, the LU #200 is specified as being in the first prohibition period. Therefore, the CHA 109 or any other CHA 109 provided with the format command does not format (shredding included) the virtual volume #10 associated with the LU #200. Specifically, as a response to the format command, busy or error is returned to the host 101.

Figure 10:
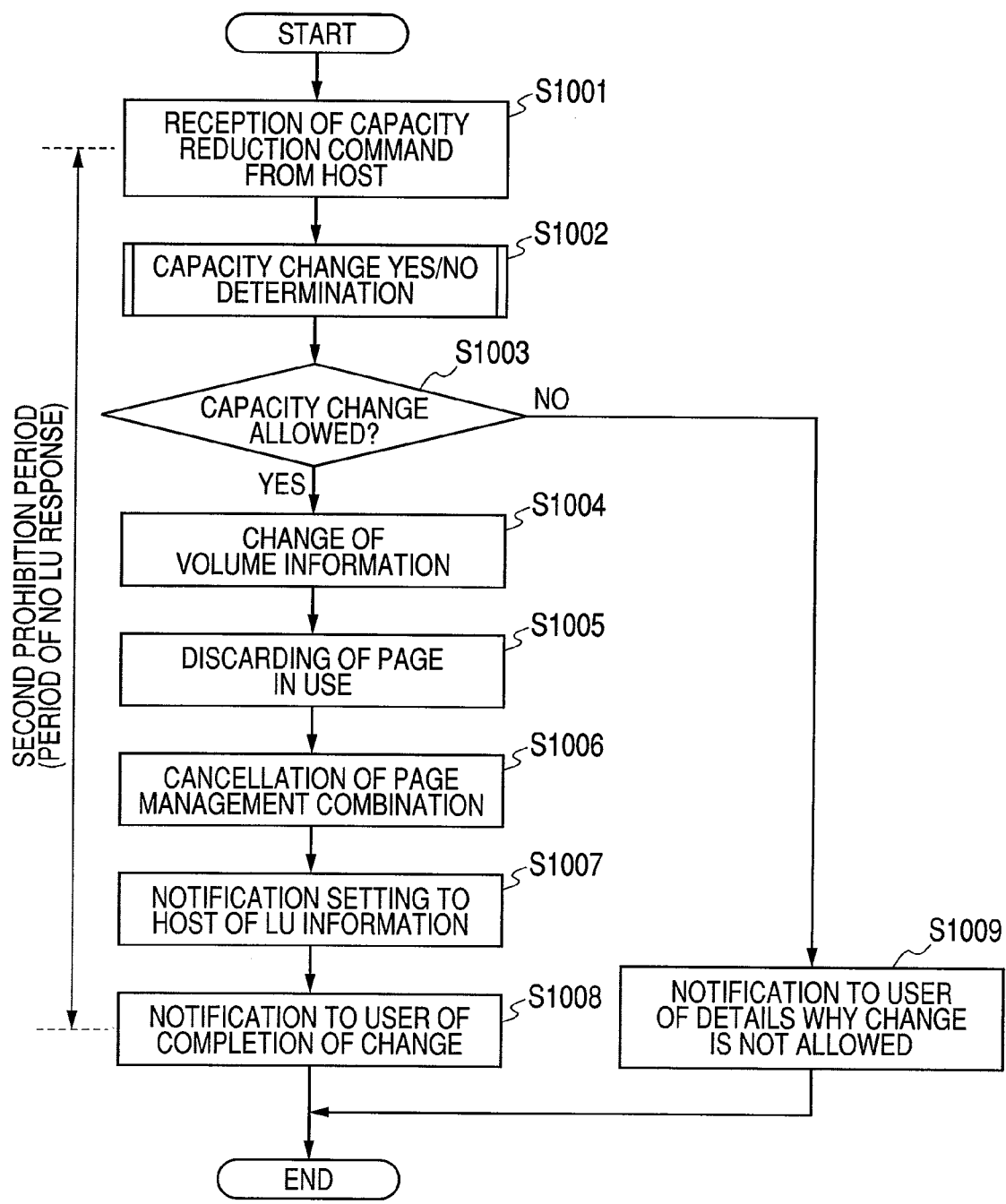
FIG. 10 is a flowchart of a capacity reduction process.

FIG. 10 is a flowchart of the capacity reduction process.

The capacity reduction processing section 1092 receives a capacity reduction command specifying the LU #200 from the host 101 (S1001). Thus received capacity reduction command is for reducing the capacity from 3 GB to 2 GB.

The capacity reduction processing section 1092 makes the capacity change YES/NO determination (S1002). The flow of such a capacity change YES/NO determination will be described later by referring to FIG. 12.

When the determination result of S1002 tells that the capacity change is not allowed (S1003: NO), the capacity reduction processing section 1092 notifies the host 101 of the details of the result (S1009). As a result, the host 101 displays, on its display device, a screen exemplified in FIG. 15C, e.g., a screen showing a message telling that the capacity reduction is not allowed, and the reason why.

On the other hand, when the determination result of S1002 tells that the capacity change is allowed (S1003: YES), the capacity reduction processing section 1092 goes through the processes of S1004 to S1008.

That is, first of all, the capacity reduction processing section 1092 changes the volume information 1113 (S1004), i.e., in the volume information 1113, the volume capacity of the virtual volume #10 is updated. To be specific, as shown in FIG. 11A, in accordance with the capacity reduction command received in S1001, the volume capacity of the virtual volume #10 is updated from "3 GB" to "2 GB".

Next, the capacity reduction processing section 1092 discards any page in use (S1005). To be specific, the capacity reduction processing section 1092 discards any page allocated to a virtual area (s) configuring a segment equal to a reduction of storage capacity, i.e., segment at the end in this example. To be more specific, the capacity reduction processing section 1092 identifies the page #10 by referring to the page management information 1111 using the page management#1 corresponding to the head segment of the virtual volume #10, i.e., the page management# identified by the volume information 1113. Herein, the page #10 is the one allocated to the virtual area(s) configuring the segment equal to the reduction of the storage capacity. As shown in FIG. 11B, for thus identified page #10, the capacity reduction processing section 1092 updates the state of page use, i.e., the state of page use in the page information 1112, from "in use" to "not in use", and as shown in FIG. 11C, the page# thereof in the page management information 1111 is updated to a null value of "0".

Next, the capacity reduction processing section 1092 cancels the page management combination (S1006). Canceling the page management combination means to remove, from the virtual volume #10, any segment equal to the reduction of the storage capacity including the last segment. To be specific, as shown in FIG. 11C, the capacity reduction processing section 1092 updates, in the page management information 1111, the next page management# from the page management#3 to a null value "0". The next page management# to be updated as such is the one in the record showing the page management#3 corresponding to the last segment of the virtual volume #10 as the next page management#, i.e., record under the page management# of 2. As such, by updating, to a null value, the next page management# in the record showing the record corresponding to the removing segment as the next page management#, the number of the segments equal to the reduction of the storage capacity is removed from the end of the virtual volume #10.

Next, the capacity reduction processing section 1092 sets LU information as a notification target to the host (S1007). The LU information includes information indicating the storage capacity of the LU #200 after the capacity reduction, i.e., 2 GB. When a predetermined inquiry command comes from the host 101 sometime later, for example, the LU information is notified to the host 101 as a response against the inquiry command.

Lastly, the capacity reduction processing section 1092 notifies the host 101 of completion of capacity change (S1008). As a result, the host 101 displays, on its display device, a screen exemplified in FIG. 15D, e.g., a screen showing a message telling that the storage capacity of the LU #200 is reduced from 3 GB to 2 GB.

This is the end of the description about the capacity reduction process. In the capacity reduction process, as described in the foregoing, after the volume information 1113 is updated, any page in use, i.e., allocated page, is discarded, and then the page management combination is cancelled. In other words, the information indicating the storage capacity of the virtual volume #10, i.e., the volume capacity, is updated, and any page allocated to the segment equal to a reduction of the capacity is changed in state to "not in use". Thereafter, the number of the segments configuring the virtual volume #10 is reduced.

Note that, during the capacity reduction process, i.e., during the processes from S1001 to S1008 or S1009, as shown in FIG. 10, for the LU #200 being the target of capacity reduction, no LU response is allowed, i.e., second prohibition period. Unlike in the first prohibition period, in the second prohibition period, in response to a format command specifying the LU #200, the virtual volume #10 associated with the LU #200 may be formatted, e.g., shredded.

Figure 12:
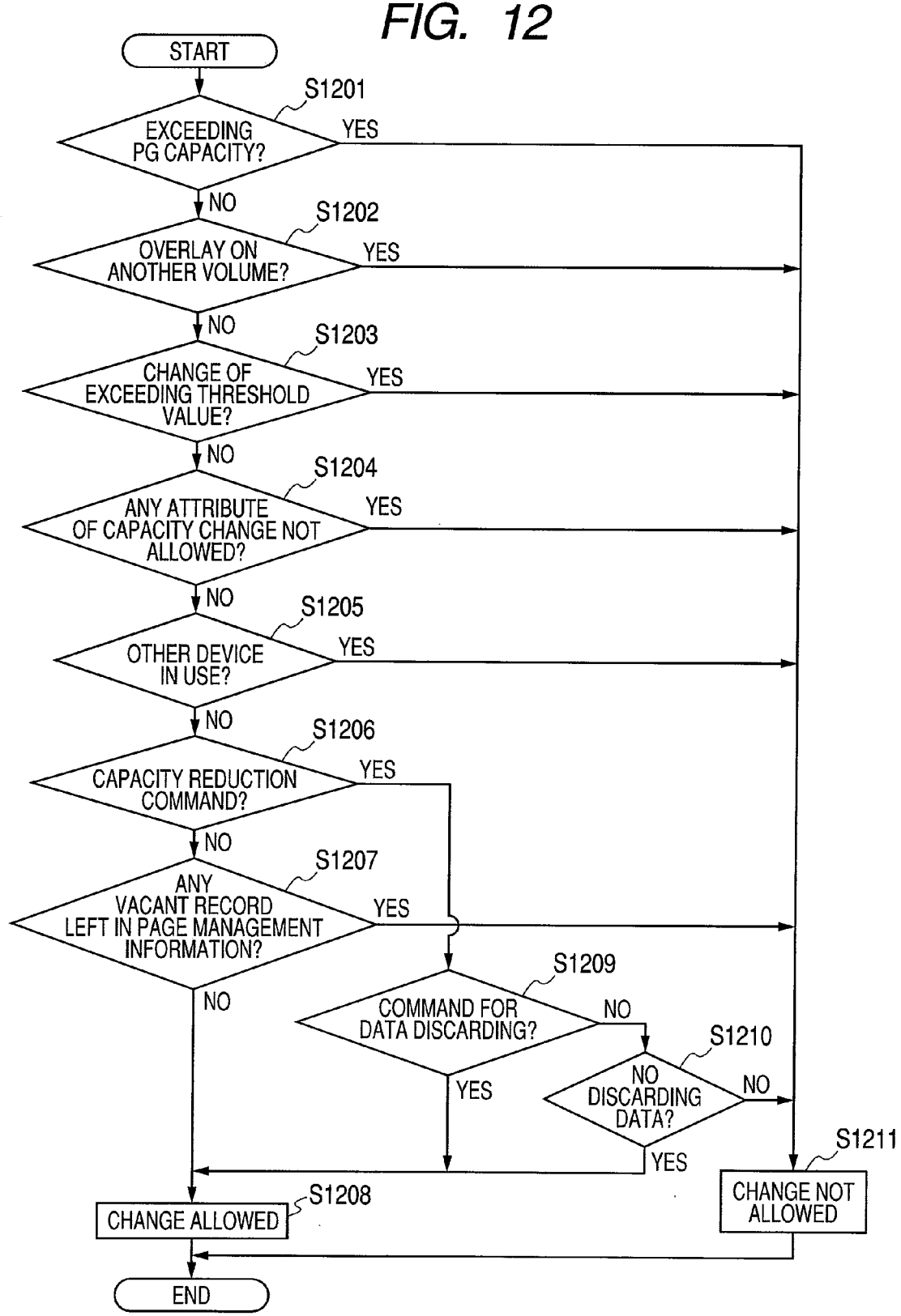
FIG. 12 is a flowchart of a capacity change YES/NO determination.

FIG. 12 is a flowchart of the capacity change YES/NO determination. Hereinafter, the capacity change means to increase or reduce the capacity.

As shown in FIG. 12, in the capacity change YES/NO determination, a plurality of sub determinations S1201 to S1207, and S1209 and S1210 are made. The sequence of such sub determinations is not restrictive to that of FIG. 12, and any sequence will also do.

Among the sub determinations S1201 to S1207, and S1209 and S1210, especially the sub determinations to be made in the capacity increase process are S1201, S1202, S1203, and S1207, and the sub determinations to be made in the capacity reduction process are S1209 and S1210. The sub determinations to be made both in the capacity increase process and the capacity reduction process are S1204, S1205, and S1206. In other words, in the capacity increase process, S1209 and S1210 are not executed, and in the capacity reduction process, S1201, S1202, and S1203 may be skipped, and S1207 is not executed.

In S1201, based on the volume information 1113 and the PG information 1114, a determination is made whether or not the storage capacity of the virtual volume #10 after a change following the capacity change command, i.e., capacity increase or decrease command, is exceeding the PG capacity of the PG #3. For example, in the PG information 1114 of FIG. 4A, the PG #3 has the storage capacity of 1 TB (TeraByte), i.e., the storage capacity that can manage the logical volume of 4 GB in units of 256 (4 GB×256=1 TB).

When the result of the sub determination of S1201 is positive (S1201:YES), the procedure goes to S1202, and when the result of the sub determination of S1201 is negative (S1201: NO), the result of the capacity change YES/NO determination is determined as NO, i.e., the capacity change is not allowed (S1211). This accordingly prevents the virtual volume #10 from being across a plurality of virtual PGs. This thus eliminates the need to newly create any virtual PG when the virtual volume #10 is increased in capacity. Herein, when the procedure goes to S808 after the determination is made as NO in S1201 and after S1211 is through, for example, the screen of FIG. 15A displays thereon the reason why the capacity change is not allowed, i.e., the storage capacity of the virtual volume #10 after the capacity increase exceeds the storage capacity of the PG #3.

In S1202, a determination is made whether or not the virtual volume #10 after the capacity change following the capacity change command is overlaid on the virtual volume #8 also in the PG #3. To be specific, based on the volume information 1113, a determination is made whether or not the end address of the virtual volume #10 after the capacity change following the capacity change command goes beyond the head address of the virtual volume #8 also in the PG #3.

When the result of the sub determination of S1202 is positive (S1202:YES), the procedure goes to S1203, and when the result of the sub determination of S1202 is negative (S1202: NO), the capacity change YES/NO determination is determined as NO, i.e., the capacity change is not allowed (S1211). This thus favorably prevents the virtual volume #10 from being overlaid on the virtual volume #8. Herein, when the procedure goes to S808 after the determination is made as NO in S1202 and after S1211 is through, for example, the screen of FIG. 15A displays thereon the reason why the capacity change is not allowed, i.e., the virtual volume #10 after the capacity increase is overlaid on the virtual volume #8 also in the PG #3.

In S1203, based on the various information, i.e., the volume information 1113, the page information 1112, and the page management information 1111, a determination is made whether or not a ratio of the entire capacity of one or more virtual areas to the entire capacity of one or more pages is exceeding a threshold value "50%" (refer to FIG. 5A) corresponding to the virtual volume #10. Herein, the one or more virtual areas are those not allocated with any of the pages in the virtual volume #10, and the one or more pages are those not allocated to any of the virtual areas.

When the result of the sub determination of S1203 is positive (S1203:YES), the procedure goes to S1204, and when the result of the sub determination of S1203 is negative (S1203: NO), the capacity change YES/NO determination is made as NO, i.e., the capacity change is not allowed (S1211). This thus favorably prevents the storage capacity of the virtual volume #10 being increased too much considering the number of the pages not yet allocated thereto. Herein, when the procedure goes to S808 after the determination is made as NO in S1203 and after S1211 is through, for example, the screen of FIG. 15A displays thereon the reason why the capacity change is not allowed, i.e., the threshold value for the virtual volume #10 is exceeded.

In S1204, based on the volume information 1113, a determination is made whether the volume attribute of the virtual volume #10 is set with "capacity change not allowed" or not.

When the result of the sub determination of S1204 is positive (S1204:YES), the procedure goes to S1205, and when the result of the sub determination of S1204 is negative (S1204: NO), the capacity change YES/NO determination is made as NO, i.e., the capacity change is not allowed (S1211). As such, if the virtual volume #10 is so set as not to be changed in storage capacity, the virtual volume #10 can be prevented from being changed in storage capacity. When the procedure goes to S808 after the determination is made as NO in S1204 and after S1211 is through, for example, the screen of FIG. 15A displays thereon the reason why the capacity change is not allowed, i.e., the virtual volume #10 is set with "capacity change not allowed". Alternatively, in addition to the volume attribute of "capacity change not allowed", the attribute of "only capacity increase not allowed" or the attribute of "only capacity reduction not allowed" may be an option. If with "only capacity increase not allowed", the storage capacity cannot be increased but reduced, and if with the attribute of "only capacity reduction not allowed", the storage capacity cannot be reduced but increased.

In S1205, based on the volume information 1113, a determination is made whether or not the virtual volume #10 is being used for any other function, e.g., computer program. To be specific, for example, for such a determination, the volume attribute of the virtual volume #10 is referred to see whether it is showing "paired volume" or not.

When the result of the sub determination of S1205 is positive (S1205:YES), the procedure goes to S1206, and when the result of the sub determination of S1205 is negative (S1205: NO), the capacity change YES/NO determination is made as NO, i.e., the capacity change is not allowed (S1211). As such, the configuration of a volume pair can be remained the same, e.g., one volume and the other volume can have the same storage capacity. When the procedure goes to S808 after the determination is made as NO in S1205, i.e., the capacity change is not allowed and after S1211 is through, for example, the screen of FIG. 15A displays thereon the reason why the capacity change is not allowed, i.e., the virtual volume #10 is being used for any other function.

In S1206, a determination is made whether the capacity change command is for reducing the capacity or not. When the result of the sub determination of S1206 is positive (S1206: YES), the procedure goes to S1209, and when the result of the sub determination of S1206 is negative (S1206: NO), the procedure goes to S1207.

In S1207, a determination is made whether any vacant record is left in the page management information 1111 or not. The expression of "vacant record" means a record whose page management# is not set to any of the next page management# in other records, i.e., a record not linked to any of the records. The expression of "any vacant record is left" means that the number of such vacant records is k (where k is an integer of 0 or larger).

When the result of the sub determination of S1207 is positive (S1207: YES), the capacity change YES/NO determination is made as YES, i.e., the capacity change is allowed (S1208), and when the result of the sub determination of S1207 is negative (S1207: NO), the capacity change YES/NO determination is made as NO, i.e., the capacity change is not allowed (S1211). This thus favorably prevents the page management information 1111 from carrying no vacant record. Herein, when the procedure goes to S808 after the determination is made as NO in S1207, i.e., the capacity change is not allowed and after S1211 is through, for example, the screen of FIG. 15A displays thereon the reason why the capacity change is not allowed, i.e., the page management information 1111 may carry no vacant record.

In S1209, a determination is made whether or not the capacity increase command is for discarding data. When the result of the sub determination of S1209 is positive (S1209: YES), the capacity change YES/NO determination is made as YES, i.e., the capacity change is allowed (S1208), and when the result of the sub determination of S1209 is negative (S1209: NO), the procedure goes to S1210. That is, when the capacity reduction command includes a designation of discarding data, even if the segment equal to a reduction of the storage capacity, i.e., segment(s) to be removed from the virtual volume #10, is allocated with a page, in the capacity reduction process, the page is changed from "in use" to "not in use".

In S1210, based on the volume information 1113 and the page management information 1111, a determination is made whether there is any discarding data or not. In other words, a determination is made whether or not any page is allocated to any of the virtual areas configuring the segment equal to the reduction of the storage capacity.

When the result of the sub determination of S1210 is positive (S1210: YES), the capacity change YES/NO determination is made as YES, i.e., the capacity change is allowed (S1208), and when the result of the sub determination of S1210 is negative (S1210: NO), the capacity change YES/NO determination is made as NO, i.e., the capacity change is not allowed (S1211). As a result, even if there is no designation of discarding data in the capacity reduction command, when the segment equal to the reduction of the storage capacity is not allocated with any of the pages, the procedure goes to S1004 and thereafter in the capacity reduction process. In other words, when there is no designation of discarding data in the capacity reduction command, and when the segment equal to the reduction of the storage capacity is allocated with a page, the procedure does not go to S1004 and thereafter in the capacity reduction process so that the data stored in the page is accordingly saved. Herein, when the procedure goes to S808 after the determination is made as NO in S1210, i.e., the capacity change is not allowed and after S1211 is through, for example, the screen of FIG. 15C displays thereon the reason why the capacity change is not allowed, i.e., there is no designation of discarding data in the capacity reduction command, and there is data in the storage capacity to be reduced.

This is the end of the description about the embodiment. Note that, in this embodiment, the following is also an option.

Figure 16A:
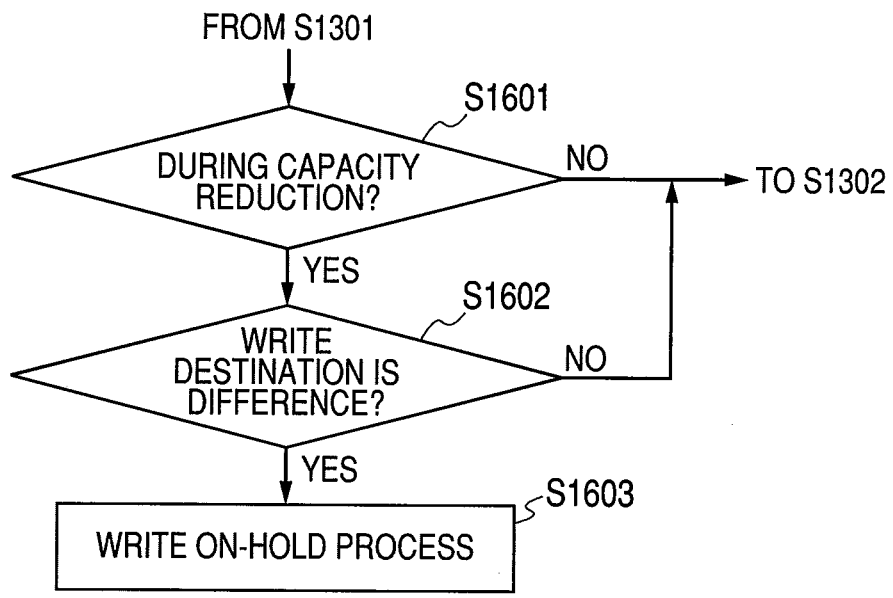
FIG. 16A shows a modified example of the write process of FIG. 13.

That is, when receiving a write request, as shown in FIG. 16A, the write processing section determines whether the virtual volume #10 associated with the LU #200 specified in the write request is during capacity reduction or not (S1601). When it is not during capacity reduction (S1601: NO), the write processing section executes the process of S1302 (refer to FIG. 13). On the other hand, when it is during capacity reduction (S1601: YES), the write processing section determines whether or not the write-destination virtual area is a virtual area being a component of the segment equal to a reduction of the storage capacity (S1602). When the determination result of S1602 is negative (S1602: NO), the write processing section executes the process of S1302. On the other hand, when the determination result of S1602 is positive (S1602: YES), the write processing section executes a write on-hold process (S1603). In the write on-hold process, executed is a process of not making a response to the host 101 against the write request from the host 101, or a process of returning a busy or retry request to the host 101. In the description above, when the virtual volume #10 is during capacity increase, the procedure goes to S1302 and thereafter, but when the virtual volume #10 is during capacity reduction, and when the write-destination virtual area is a virtual area in the segment to be removed, the procedure does not go to S1302 and thereafter.

Figure 16B:
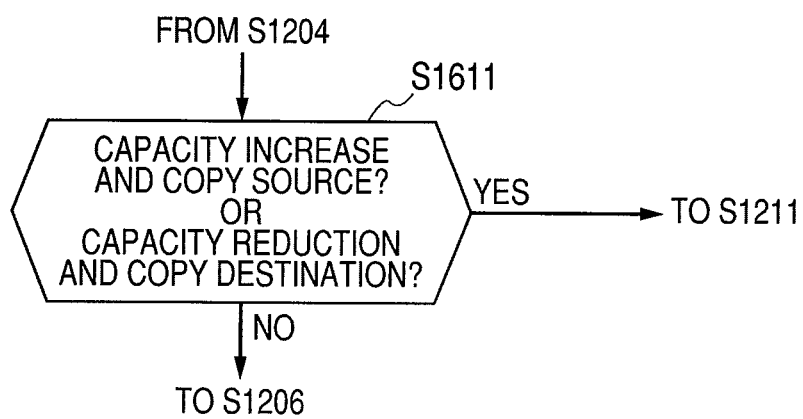
FIG. 16B shows S1611 as a modified example of S1205 of FIG. 12.

Moreover, as shown in FIG. 16B, the procedure may go to S1611 as an alternative to S1205 of FIG. 12. In S1611, a determination is made whether the storage capacity is to be increased or not, and whether the virtual volume #10 is a copy source or not, or whether the storage capacity is to be reduced or not, and whether the virtual volume #10 is a copy destination or not. When the result of the sub determination of S1611 is positive (S1611: YES), the procedure goes to S1206, and when the result of the sub determination of S1611 is negative (S1611: NO), the procedure goes to S1211.

While the invention has been described in detail, the foregoing description is in all aspects illustrative and not restrictive. It is understood that numerous other modifications and variations can be devised without departing from the scope of the invention. For example, as an alternative to the host 101, the capacity change command may be provided from any other type of computer such as management device of the storage system 105 or others.

What is claimed is:

1. A storage system, comprising:
one or more physical storage devices including a plurality of physical storage areas; and
a controller comprising a virtual volume including a plurality of first virtual areas to a host device,
wherein the controller:
receives, from the host device, data and a write request specifying the virtual volume and an address indicating one of the plurality of first virtual areas,
when the one of the plurality of first virtual areas specified by the address is not allocated from the plurality of physical storage areas, allocates at least one of the plurality of physical storage areas not yet in use to the one of the plurality of first virtual areas,
writes the data into the allocated physical storage area,
receives a capacity change command specifying the virtual volume and including a volume capacity value indicating a storage capacity of the virtual volume,
changes an upper limit of a capacity of the virtual volume based on the volume capacity value indicating a storage capacity, and
adds at least one second virtual area to the virtual volume, the second virtual area being different from the plurality of first virtual areas, when the capacity change command indicates expanding the upper limit of the capacity of the virtual volume,
wherein the management information includes:
physical storage area information indicating a state of use of each of the physical storage areas;
physical storage area management information indicating which of the physical storage areas is allocated to which of the virtual areas in the virtual volume; and
volume information including the volume capacity value indicating the storage capacity of the virtual volume, and (2A) wherein when the capacity change command is for capacity increase, the processor:
  (2A-1) updates the physical storage area management information to include, as a component of the virtual volume, not only the virtual areas of the virtual volume before the capacity increase but also a virtual area corresponding to a first difference between the virtual volume before the capacity increase and the virtual volume after the capacity increase,
  (2A-2) increases the volume capacity value in the volume information to the volume capacity value indicating the storage capacity following the capacity increase command,
  (2A3) after the processes of (2A-1) and (2A-2), puts the storage capacity of the virtual volume associated with the device after the capacity increase in a state ready for notification to the host device, and
(2B) wherein when the capacity change command is for capacity reduction, the processor:
  (2B-1) reduces the volume capacity value in the volume information to the volume capacity value indicating the storage capacity following the capacity reduction command,
  (2B-2) changes, from in-use to not-in-use, when a virtual area corresponding to a second difference between the virtual volume before the capacity reduction and the virtual volume after the capacity reduction is allocated any of the physical storage areas, the state of use of the physical storage area allocated to the virtual area corresponding to the second difference,
  (2B-3) updates the physical storage area management information not to include, as the component of the virtual volume, the virtual area corresponding to the second difference, and
  (2B-4) after the processes of (2B-1) to (2B-3), puts the storage capacity of the virtual volume associated with the device after the capacity reduction in the state ready for notification to the host device,
wherein the virtual volume is a predetermined virtual storage space,
wherein the management information includes storage space management information including a space capacity value indicating a capacity of the virtual storage space,
wherein the virtual storage space includes another virtual volume,
wherein the physical storage area management information is configured by a plurality of records,
wherein the records correspond to an area configured by one or more of the virtual areas, and including a record ID and a physical storage area ID allocated to any of the virtual areas corresponding to the records,
wherein in the process (2A-1), among an not-in-use record of the plurality of records configuring the physical storage area management information, the record corresponding to the virtual area corresponding to the first difference is selected as being associated with the virtual volume,
wherein the volume management information includes, about the virtual volume and the other virtual volume, not only the capacity value but also a head address in the virtual storage space, an ID of the associated record, and a threshold ratio,
wherein the processor makes a first determination whether or not the capacity increase is allowed by following the capacity increase command, and when a result of the first determination is negative, the processes (2A-1) to (2A-3) are not executed, and
wherein the result of the first determination is positive when requirements of (3-1) to (3-4) are entirely satisfied, and is negative when the requirements thereof are not entirely satisfied, the requirements of (3-1) to (3-4) including:
(3-1) the storage capacity following the capacity increase command is smaller in value than the space capacity value,
(3-2) a head or end address of the virtual volume having the storage capacity following the capacity increase command is not falling in an address range of the other virtual volume specified by a head address and the capacity value in the volume information,
(3-3) the number of the not-in-use records of the plurality of records configuring the physical storage area management information is equal to or larger than the number of the records corresponding to the virtual area of the first difference, and
(3-4) in the virtual volume having the storage capacity following the capacity change command, a ratio of an entire capacity of the one or more virtual areas not allocated with any of the physical storage areas to an entire capacity of the one or more physical storage areas not allocated with any of the virtual areas is equal to or smaller than the threshold ratio of the virtual volume.

2. The storage system according to claim 1,
wherein the processor makes a second determination of whether or not the capacity reduction is allowed by following the capacity reduction command, and when a result of the second determination is negative, the processes (2B-1) to (2B-4) are not executed, and
wherein the result of the second determination is positive when requirements of (4-1) or (4-2) are satisfied, and is negative when the requirements thereof are not entirely satisfied, the requirements (4-1) and (4-2) including:
(4-1) there is a designation of allowing discarding of data stored in the physical storage area allocated to the virtual area corresponding to the second difference, and
(4-2) the virtual area corresponding to the second difference is not allocated any of the physical storage areas.

3. The storage system according to claim 1, wherein when the processor is provided with a format command specifying the device associated with the virtual volume, for the virtual volume, when the process (2A-1) or (2A-2) is being executed, formatting following the format command is not performed.

4. The storage system according to claim 1,
wherein the management information includes:
physical storage area information indicating state of use of each of the physical storage areas;
physical storage area management information indicating which of the physical storage areas is allocated to which of the virtual areas in the virtual volume; and
volume information including the volume capacity value indicating the storage capacity of the virtual volume, and
wherein when the capacity change command is for capacity reduction, the processor:
(12-1) reduces the volume capacity value in the volume information to the volume capacity value indicating the storage capacity following the capacity reduction command,
(12-2) changes, from in-use to not-in-use, when a virtual area corresponding to a second difference between the virtual volume before the capacity reduction and the virtual volume after the capacity reduction is allocated any of the plurality of physical storage areas, the state of use of the physical storage area allocated to the virtual area corresponding to the second difference in the page information, (12-3) updates the physical storage area management information not to include, as a component of the virtual volume, the virtual area corresponding to the second difference, and (12-4) after the processes of (12-1) to (12-3), puts the storage capacity of the virtual volume related to the device after the capacity reduction in a state ready for notification to the host device.

5. The storage system according to claim 4, wherein the processor makes a second determination of whether or not the capacity reduction is allowed by following the capacity reduction command, and when a result of the second determination is negative, the processes (12-1) to (12-4) are not executed, and wherein the result of the second determination is negative when requirements of (13-1) are not satisfied, wherein the requirements of (13-1) include:

(13-1) there is a designation of allowing discarding of data stored in the physical storage area allocated to the virtual area corresponding to the second difference.

6. The storage system according to claim 5, wherein the processor makes the second determination of whether or not the capacity reduction is allowed by following the capacity reduction command, and when the result of the second determination is negative, the processes (12-1) to (12-4) are not executed, and wherein the result of the second determination is negative when requirements of (14-1) are not satisfied, the requirements of (14-1) including:

(14-1) the virtual area corresponding to the second difference is not allocated any of the plurality of physical storage areas.

7. The storage system according to claim 6, wherein the processor makes the second determination whether or not the capacity reduction is allowed by following the capacity reduction command, and when the result of the second determination is negative, the processes (12-1) to (12-4) are not executed, and wherein the result of the second determination is negative when requirements of (15-1) are not satisfied, the requirements of (15-1) including:

(15-1) the virtual volume specified by the capacity reduction command is not a copy destination of volume-to-volume copy.

8. A storage system, comprising:
one or more physical storage devices including a plurality of physical storage areas; and
a controller comprising a virtual volume including a plurality of first virtual areas to a host device,
wherein the controller:
receives, from the host device, data and a write request specifying the virtual volume and an address indicating one of the plurality of first virtual areas,
when the one of the plurality of first virtual areas specified by the address is not allocated from the plurality of physical storage areas, allocates at least one of the plurality of physical storage areas no yet in use to the one of the plurality of first virtual areas,
writes the data into the allocated physical storage area,
receives a capacity change command specifying the virtual volume and including a volume capacity value indicating a storage capacity of the virtual volume,
changes an upper limit of a capacity of the virtual volume based on the volume capacity value indicating a storage capacity, and
adds at least one second virtual area to the virtual volume, the second virtual area being different from the plurality of first virtual areas, when the capacity change command indicates expanding the upper limit of the capacity of the virtual volume,
wherein the management information includes:
physical storage area management information indicating which of the physical storage areas is allocated to which of the virtual areas in the virtual volume; and
volume information including the volume capacity value indicating the storage capacity of the virtual volume, and
when the capacity change command is for capacity increase, the processor:

(6-1) updates the physical storage area management information to include, as a component of the virtual volume, not only the virtual areas of the virtual volume before the capacity increase but also a virtual area corresponding to a first difference between the virtual volume before the capacity increase and the virtual volume after the capacity increase, (6-2) increases the volume capacity value in the volume information to the volume capacity value indicating the storage capacity following the capacity increase command, and (6-3) after the processes of (6-1) and (6-2), puts the storage capacity of the virtual volume associated with the device after the capacity increase in a state ready for notification to the host device, wherein the virtual volume is a predetermined virtual storage space, wherein the processor makes a first determination whether or not the capacity increase is allowed by following the capacity increase command, and when a result of the first determination is negative, the processes (6-1) to (6-3) are not executed, and wherein the result of the first determination is negative when at least one requirement is not satisfied, the at least one requirement comprising:

a head or end address of the virtual volume having the storage capacity following the capacity increase command is not falling in an address range of the other virtual volume specified by a head address and the capacity value in the volume information.

9. The storage system according to claim 8, wherein the virtual volume is a predetermined virtual storage space, and wherein the at least one requirement further comprises:
the storage capacity following the capacity increase command is smaller in value than the space capacity value.

10. The storage system according to claim 8, wherein the physical storage area management information is configured by a plurality of records, wherein the records are corresponding to an area configured by one or more of the virtual areas, and including a physical storage area ID allocated to any of the virtual areas corresponding to the records, wherein in the process of (6-1), among any not-in-use record of the plurality of records configuring the physical storage area management information, the record corresponding to the virtual area of the first difference is selected as being associated with the virtual volume, and wherein the at least one requirement further comprises:
the number of the not-in-use records of the plurality of records configuring the physical storage area management information is equal to or larger than the number of the records corresponding to the virtual area of the first difference.

11. The storage system according to claim 8, wherein the at least one requirement further comprises:

in the virtual volume having the storage capacity following the capacity change command, a ratio of an entire capacity of the one or more virtual areas not allocated with any of the plurality of physical storage areas to an entire capacity of the one or more physical storage areas not allocated with any of the virtual areas is equal to or smaller than a predetermined ratio of the virtual volume.

12. The storage system according to claim 8, wherein the at least one requirement further comprises:

virtual volume specified by the capacity increase command is not a copy source for volume-to-volume copy.

13. A device capacity change method, comprising the steps of:

providing one or more physical storage devices including a plurality of physical storage areas;

providing a virtual volume including a plurality of first virtual areas to a host device;

receiving, from the host device, data and a write request specifying the virtual volume and an address indicating one of the plurality of first virtual areas;

when the one of the plurality of first virtual areas specified by the address is not allocated from the plurality of physical storage areas, allocating at least one of the plurality of physical storage areas not yet in use to the one of the plurality of first virtual areas;

writing the data into the allocated physical storage area;

receiving a capacity change command specifying the virtual volume and including a volume capacity value indicating a storage capacity of the virtual volume;

changing an upper limit of a capacity of the virtual volume based on the volume capacity value indicating a storage capacity;

adding at least one second virtual area to the virtual volume, the second virtual area being different from the plurality of first virtual areas, when the capacity change command indicates expanding the upper limit of the capacity of the virtual volume, wherein the management information includes:

physical storage area information indicating a state of use of each of the physical storage areas;

physical storage area management information indicating which of the physical storage areas is allocated to which of the virtual areas in the virtual volume; and volume information including the volume capacity value indicating the storage capacity of the virtual volume, and (2A) wherein when the capacity change command is for capacity increase, the processor performs the steps of:

(2A-1) updating the physical storage area management information to include, as a component of the virtual volume, not only the virtual areas of the virtual volume before the capacity increase but also a virtual area corresponding to a first difference between the virtual volume before the capacity increase and the virtual volume after the capacity increase;

(2A-2) increasing the volume capacity value in the volume information to the volume capacity value indicating the storage capacity following the capacity increase command;

(2A3) after the processes of (2A-1) and (2A-2), putting the storage capacity of the virtual volume associated with the device after the capacity increase in a state ready for notification to the host device, and (2B) wherein when the capacity change command is for capacity reduction, the processor performs the steps of:

(2B-1) reducing the volume capacity value in the volume information to the volume capacity value indicating the storage capacity following the capacity reduction command, (2B-2) changing, from in-use to not-in-use, when a virtual area corresponding to a second difference between the virtual volume before the capacity reduction and the virtual volume after the capacity reduction is allocated any of the physical storage areas, the state of use of the physical storage area allocated to the virtual area corresponding to the second difference, (2B-3) updating the physical storage area management information not to include, as the component of the virtual volume, the virtual area corresponding to the second difference, and (2B-4) after the processes of (2B-1) to (2B-3), putting the storage capacity of the virtual volume associated with the device after the capacity reduction in the state ready for notification to the host device, wherein the virtual volume is a predetermined virtual storage space, wherein the management information includes storage space management information including a space capacity value indicating a capacity of the virtual storage space, wherein the virtual storage space includes another virtual volume, wherein the physical storage area management information is configured by a plurality of records, wherein the records correspond to an area configured by one or more of the virtual areas, and including a record ID and a physical storage area ID allocated to any of the virtual areas corresponding to the records, wherein in the process (2A-1), among an not-in-use record of the plurality of records configuring the physical storage area management information, the record corresponding to the virtual area corresponding to the first difference is selected as being associated with the virtual volume, wherein the volume management information includes, about the virtual volume and the other virtual volume, not only the capacity value but also a head address in the virtual storage space, an ID of the associated record, and a threshold ratio, wherein the processor makes a first determination whether or not the capacity increase is allowed by following the capacity increase command, and when a result of the first determination is negative, the processes (2A-1) to (2A-3) are not executed, and wherein the result of the first determination is positive when requirements of (3-1) to (3-4) are entirely satisfied, and is negative when the requirements thereof are not entirely satisfied, the requirements of (3-1) to (3-4) including:

(3-1) the storage capacity following the capacity increase command is smaller in value than the space capacity value, (3-2) a head or end address of the virtual volume having the storage capacity following the capacity increase command is not falling in an address range of the other virtual volume specified by a head address and the capacity value in the volume information, (3-3) the number of the not-in-use records of the plurality of records configuring the physical storage area management information is equal to or larger than the number of the records corresponding to the virtual area of the first difference, and (3-4) in the virtual volume having the storage capacity following the capacity change command, a ratio of an entire capacity of the one or more virtual areas not allocated with any of the physical storage areas to an entire capacity of the one or more physical storage areas not allocated with any of the virtual areas is equal to or smaller than the threshold ratio of the virtual volume.

\* \* \* \* \*